(12) United States Patent
Woo

(10) Patent No.: US 7,296,280 B2
(45) Date of Patent: Nov. 13, 2007

(54) STEP MOVEMENT MECHANISM

(75) Inventor: Jisung Woo, Shatin (HK)

(73) Assignee: Thomson Licensing, Boulogne-Billancourt (FR)

( * ) Notice: Subject to any disclaimer, the term of this patent is extended or adjusted under 35 U.S.C. 154(b) by 337 days.

(21) Appl. No.: 10/495,606

(22) PCT Filed: Nov. 2, 2002

(86) PCT No.: PCT/EP02/12252

§ 371 (c)(1),
(2), (4) Date: Feb. 11, 2005

(87) PCT Pub. No.: WO03/042582

PCT Pub. Date: May 22, 2003

(65) Prior Publication Data

US 2005/0132392 A1    Jun. 16, 2005

(30) Foreign Application Priority Data

Nov. 15, 2001  (EP) ................... 01402930

(51) Int. Cl.
*G11B 17/22* (2006.01)

(52) U.S. Cl. ............................... 720/658

(58) Field of Classification Search ............ 720/658
See application file for complete search history.

(56) References Cited

U.S. PATENT DOCUMENTS 4,059,197 A * 11/1977 Iida ...................... 414/463
5,764,433 A * 6/1998 Hanzawa et al. ........ 360/96.6
6,512,656 B1 * 1/2003 Matsumoto et al. ..... 360/137

FOREIGN PATENT DOCUMENTS

EP        671736        9/1995

OTHER PUBLICATIONS

Search report dated Jan. 20, 2003.

* cited by examiner

*Primary Examiner*—Angel Castro
(74) *Attorney, Agent, or Firm*—Joseph J. Laks; Harvey D. Fried; Patricia Verlangieri

(57) ABSTRACT

A step movement mechanism is provided, which comprises a driven member and driving means, which drives the driven member. The driven member is formed with a plurality of equally spaced first concave cambered surfaces and a plurality of equally spaced force-bearing surface pairs. The two surfaces of each surface pair face each other. The driving means comprise a drive source to rotate a cam gear. The cam gear carries a rotation pin and stop means both rotating with the cam gear. The stop means are in contact with one of the first concave cambered surfaces when the step movement mechanism is in a stop position so as to prevent the driven member from moving. The rotation pin is temporarily in contact with one surface of the force bearing surface pair so as to move the driven member by one step when the cam gear rotates one revolution in either direction.

14 Claims, 4 Drawing Sheets

STEP MOVEMENT MECHANISM

This application claims the benefit, under 35 U.S.C. § 365 of International Application PCT/EP02/12252, filed Nov. 2, 2002, which was published in accordance with PCT Article 21(2) on May 22, 2003 in English and which claims the benefit of European patent application No. 01402930.0, filed Nov. 15, 2001.

FIELD OF THE INVENTION

The invention relates to step movement mechanism and a disk changing apparatus equipped with such a mechanism.

BACKGROUND OF THE INVENTION

When designing step movement mechanism used in a variety of products, designer frequently meets difficulties to achieve reliable step movement with reliability with a small number of parts. Mechanism designers must achieve step movement when they want to stop some parts in several positions with accurate positioning and holding it in that position even when external shocks or movements disturb the mechanical system.

Normally, a step movement mechanism has to provide several essential features such as accurate stop position control, locking the parts in stop positions, accurate distance between steps (stop positions), easiness to control, allowing tolerance of positioning sensors while still being able to keep accurate stop position and produce less noise and etc. However, in order to achieve accurate step movement and realize accurate stop position control, the conventional step movement mechanism usually has a complicated structure with a large number of parts, resulting in a reduction of reliability and an increase of the manufacturing cost.

SUMMARY OF INVENTION

It is therefore desirable to provide a step movement mechanism, which can achieve accurate step movement with a small number of parts.

According to the present invention, there is provided a step movement mechanism comprising a driven member and driving means, which drives the driven member. The driven member is formed with a plurality of equally spaced first concave cambered surfaces and a plurality of equally spaced force-bearing surface pairs. The two surfaces of each surface pair face each other. The driving means comprise a drive source to rotate a cam gear. The cam gear carries a rotation pin and stop means both rotating with the cam gear. The stop means are in contact with one of the first concave cambered surfaces when the step movement mechanism is in a stop position so as to prevent the driven member from moving. The rotation pin is temporarily in contact with one surface of the force bearing surface pair so as to move the driven member by one step when the cam gear rotates one revolution in either direction.

With the solution of the invention both the rotation pin and the stop means are driven by a driving means, e.g. an electric motor and a driving shaft. The rotation pin is used to drive the driven member by the force-bearing surfaces formed on the driven member. The stop means contacts one of the concave cambered surfaces formed on the driven member so as to hold the driven member in position when in a stop position of the step movement mechanism. When it is needed to move the driven member, the driving shaft rotates the stop means so as to separate the stop means from the driven member to make way for the driven member; the rotation pin, which also rotates with the driving shaft, pushes against one force-bearing surface on the driven member so as to move the driven member in the desired direction. When the driving shaft rotates one revolution, the driven member moves one step, and the rotating direction of the driving shaft is determined based on the desired moving direction of the driven member.

According to one aspect of the invention, each first concave cambered surface is a concave circular cylindrical surface, therefore the concave circular cylindrical surface can contact with the stop means within a certain rotation range of the pinion cam. As a result, the step movement mechanism of the invention can hold the rack cam in position even if the pinion cam over shots or under shots, and the operation performance of the step movement mechanism is improved.

According to another aspect of the invention, a portion of the circumferential surface of the stop means and the first concave cambered surfaces are circular cylindrical surfaces of the same radius, therefore the first concave cambered surfaces are in surface contact with the stop means when in a stop position, and the stability of the locking position of the rack cam can be further improved.

According to yet another aspect of the invention, the rotation pin may be used as the stop means. As a result, the structure of the step movement mechanism can be further simplified.

With the step movement mechanism of the invention, the step movement can be achieved with reliability, and all the desired functions, such as position locking function, position holding function, accurate position control function, can be obtained with very small number of parts, and there is no need for very accurate sensors.

The step movement mechanism of the invention comprises only two main parts. As a result, the step movement mechanism is very simple in structure, thus reducing the manufacturing cost.

BRIEF DESCRIPTION OF THE DRAWINGS

The invention will be described in detail below in connection with accompanying drawings, in which.

DETAILED DESCRIPTION OF THE PREFERRED EMBODIMENTS

Figure 1:
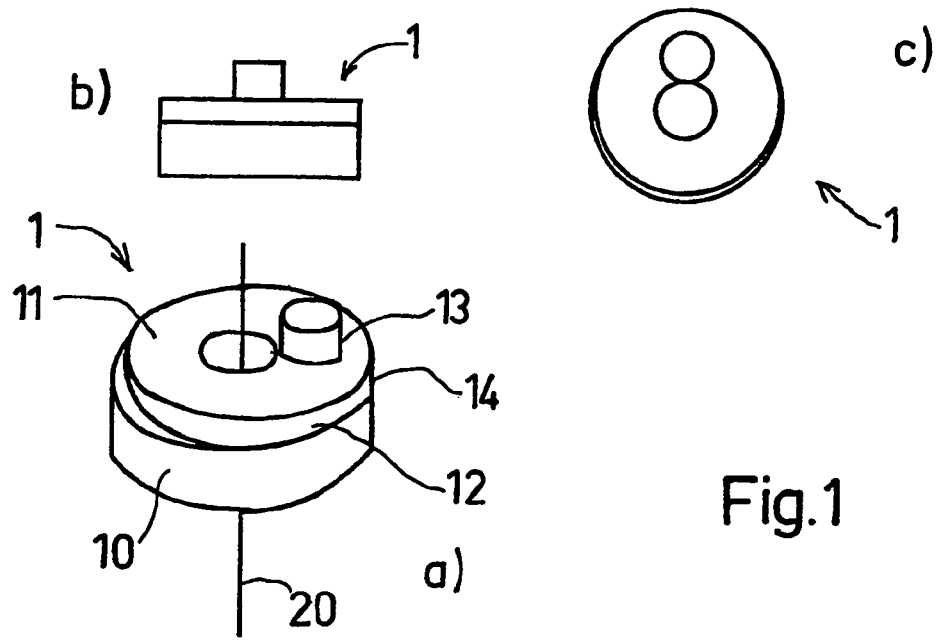
FIG. 1 is a perspective view showing the pinion cam used in the step movement mechanism of the invention.

Reference is now made to FIG. 1 which illustrates the pinion cam 1 used in the step movement mechanism of the present invention. As shown in FIG. 1, the pinion cam 1 comprises a gear or pulley 10 which is driven to rotate about its axis 20; a cam 11 fixedly disposed on the gear which has a guide and lock male cam surface 12; and a rotation pin 13 disposed on the cam 11. The rotation pin 13 is radially spaced from and runs parallel with the axis 20. When the gear 10 rotates, the cam 11 and the rotation pin 13 rotate with the gear. In the embodiment shown the rotation pin 13 has a circular cross section. However, the cross section may also take different appropriate shapes depending on the specific realization of the inventive mechanism. In FIG. 1, the pinion cam is shown in a perspective view (FIG. 1a), side view (FIG. 1b), and a top view (FIG. 1c).

Figure 2:
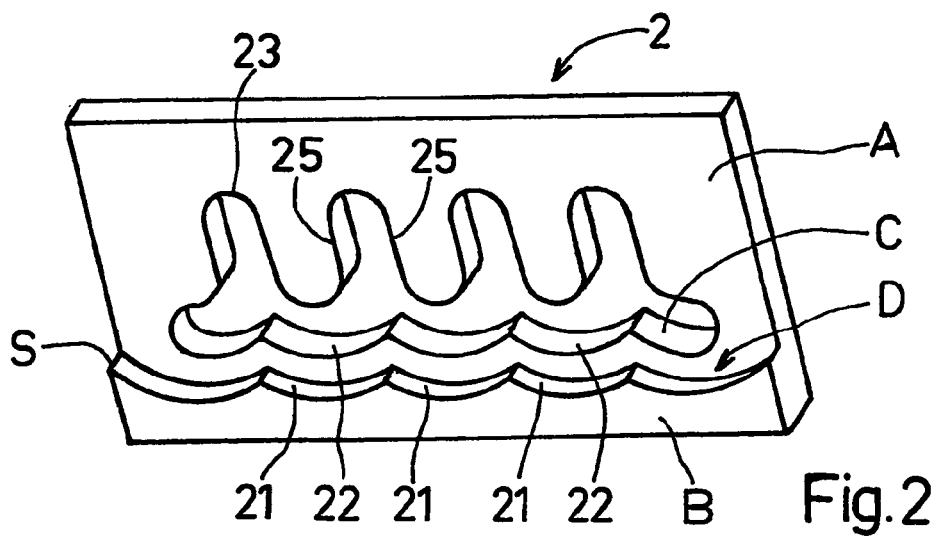
FIG. 2 is a bottom perspective view of the rack cam used in the step movement mechanism of the invention.
Figure 3:
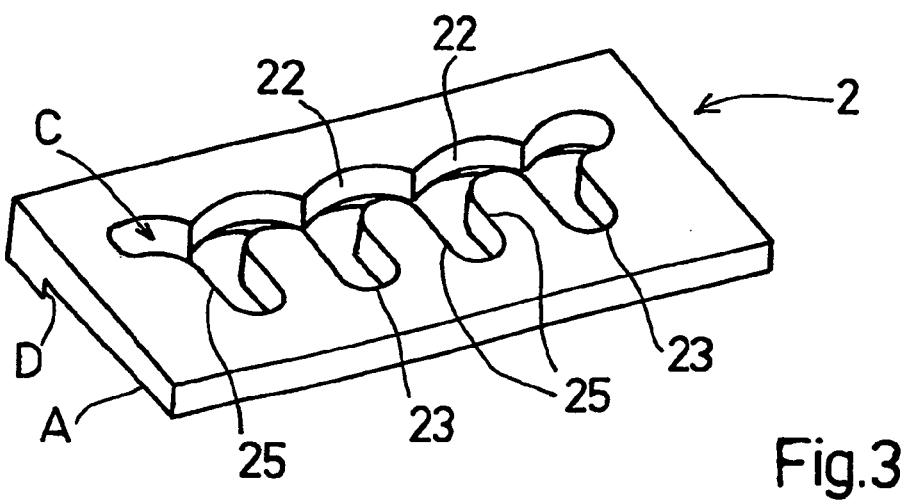
FIG. 3 is a top perspective view of the rack cam used in the step movement mechanism of the invention.

FIGS. 2 and 3 illustrate the rack cam 2 used in the step movement mechanism of the present invention, in which FIG. 2 is a bottom perspective view of the rack cam and FIG. 3 is a top perspective view of the rack cam. As shown in FIGS. 2 and 3, the rack cam 2 comprises a portion A and a portion B, and a step S is formed between the two portions. A rack cam surface C is formed in portion A of the rack cam and a guide and lock female cam surface D is formed on the step S.

The guide and lock female cam surface D is a profiled curved surface which is composed of a number of (five in FIGS. 2 and 3) first cambered surfaces 21 connected sequentially, and the first cambered surfaces have a constant pitch. The guide and lock male cam surface 12 on the cam 11 has a locking surface portion 14 which contacts with one of the first cambered surfaces 21, and the rack cam 2 is held in position when the locking surface portion 14 is in contact with one of the first cambered surfaces 21.

As shown in FIGS. 2 and 3, the rack cam surface C is a closed profiled curved surface and is formed by cutting a through slot of a comb shape in the portion A of the rack cam 2. As can be best seen in FIG. 6, the size and shape of the through slot should ensure that the rotation pin 13 on the cam 12 can move along the slot smoothly without interference when the step movement mechanism is in operation. The rack cam surface C comprises a number of second cambered surfaces 22 and a number of curved surfaces 23 in U shape, the second cambered surfaces 22 respectively correspond to the first cambered surfaces 21 of the guide and lock female cam surface D. Like the first cambered surfaces 21, the second cambered surfaces 22 are connected sequentially and have a constant pitch. The pitch of the U-shaped curved surfaces 23 is equal to the pitch of the first cambered surfaces of the guide and lock female cam surface D, so that the rack cam 2 moves one step when the pinion cam 1 rotates one revolution. As shown in FIGS. 2 and 3, two adjacent U-shaped curved surfaces 23 are connected by a cylindrical surface, the leftmost U-shaped curved surface is connected with the leftmost second cambered surface 22 through two tangent cylindrical surfaces, and similarly the rightmost U-shaped curved surface is connected with the rightmost second cambered surface 22 through two tangent cylindrical surfaces. The two flat side surfaces 25 of the U-shaped curved surface 23 are used as a pair of force-bearing surfaces. As described below, when the pinion cam 1 rotates, the rotation pin pushes against one of the two flat side surfaces so as to move the rack cam horizontally.

Figure 4:
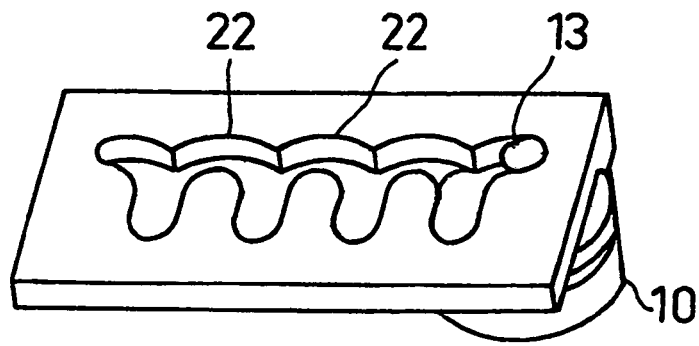
FIG. 4 is a perspective view from the top of the assembly of the pinion cam and rack cam of the invention.
Figure 5:
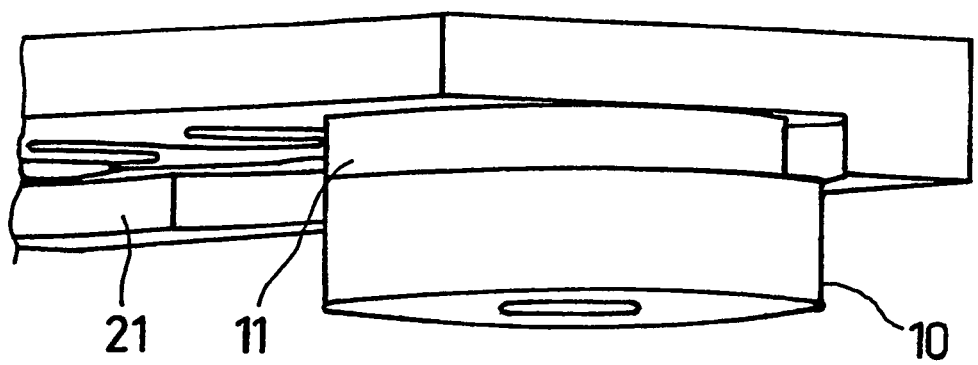
FIG. 5 is a bottom perspective view of the assembly of the pinion cam and rack cam.

In the assembly state of the step movement mechanism, as shown in FIGS. 4 and 5, the rotation pin 13 on the pinion cam 1 extends into the through slot and contacts with the rack cam surface C, and the locking surface portion 14 on the cam contacts with or separates from the first cambered surface 21 on the rack cam according to the relative position between the rack cam and the pinion cam. Preferably, each first cambered surface 21 on the rack cam is a cylindrical surface, so as to ensure that the rack cam is held in position within a certain rotation range of the pinion cam. And more preferably, both the first cambered surfaces 21 and the locking surface portion 14 on the cam are cylindrical surfaces of the same radius so as to improve the stability of the locking position of the rack cam.

Figure 6:
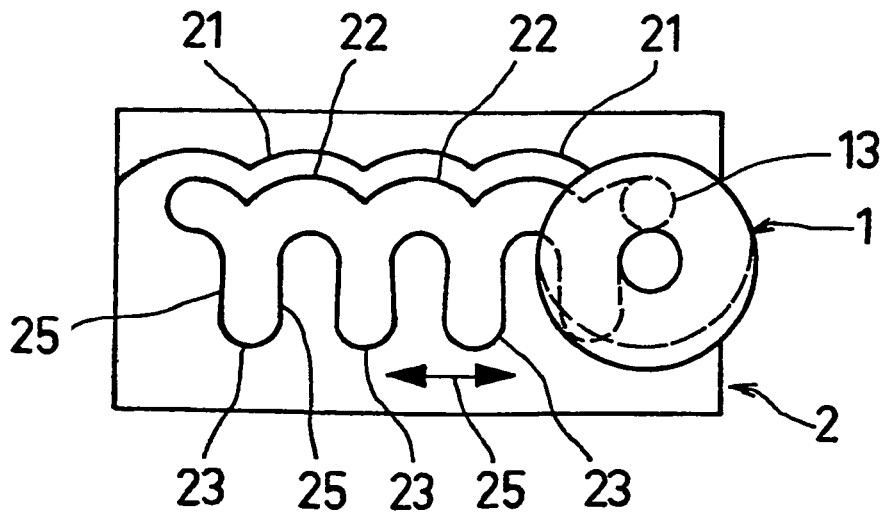
FIG. 6 shows the assembly in one of the locking positions.

FIG. 6 shows the assembly in one of the locking positions, wherein the rotation pin 13 is located directly above the axis 20 and is in contact with the rightmost second cambered surface 22 while the locking surface portion 14 on the cam is in contact with the rightmost first cambered surface 21 on the rack cam.

The operation of the step movement mechanism of the invention will be described herein below in connection with FIGS. 6 to 11.

During the operation of the step movement mechanism of the invention, the movement of the rack cam 2, which is used as a driven member, is constrained so that the rack cam 2 can only move bi-directionally, i.e. move left or right in the directions indicated by the arrow 25 in FIG. 6; and the pinion cam 1, which is used as driving means, only rotates about its axis 20.

Figure 7:
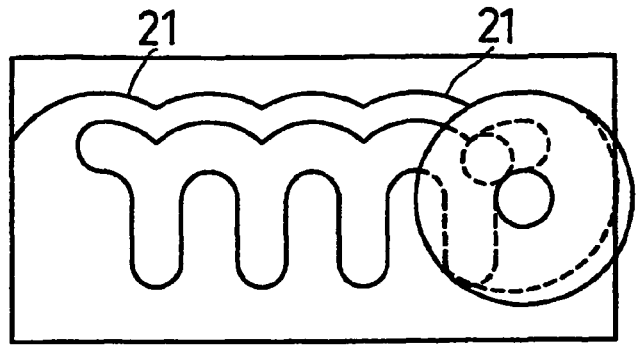
FIG. 7 shows a state when the pinion cam has been rotated 45° counterclockwise.

FIG. 7 shows the assembly in a first stop position, the locking surface 14 on the cam 12 contacts with the rightmost first cambered surface 21 on the rack cam, thus the rack cam 2 is held in position and is prevented from moving. It can be seen from FIG. 7, the rack cam cannot be moved by itself or any other external force unless the pinion cam is rotated.

The rightward or leftward movement of the rack cam can be achieved by rotating the pinion cam. FIGS. 6 to 11 show the process of moving the rack cam one step rightwards.

FIG. 7 shows a state when the pinion cam 1 has been rotated 45° counter clock-wise. As can be seen in FIG. 7, the locking surface portion on the cam is still in partial contact with the rightmost first cambered surface 21 on the rack cam. As a result, the rack cam is still held in position, thus being prevented from moving. This also explains that the step movement mechanism of the invention can hold the rack cam in position even if the pinion cam over shots or under shots.

Figure 8:
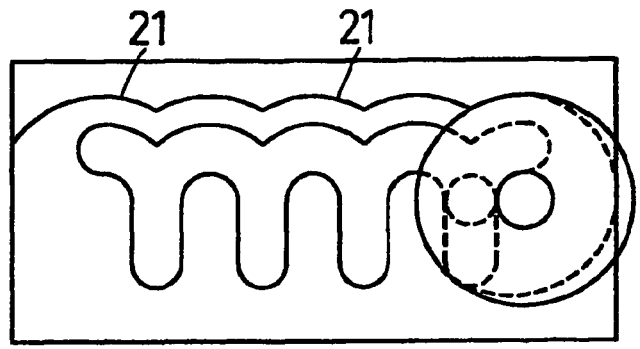
FIG. 8 shows a state when the pinion cam has been rotated 90° counterclockwise.

FIG. 8 shows a state when the pinion cam has been rotated 90° counterclockwise. It can be seen in FIG. 8 that the locking surface portion on the cam and the rightmost first cambered surface on the rack cam are in the critical contact state, and the rack cam is still held in position because of the contact between the locking surface portion and the rightmost first cambered surface.

Figure 9:
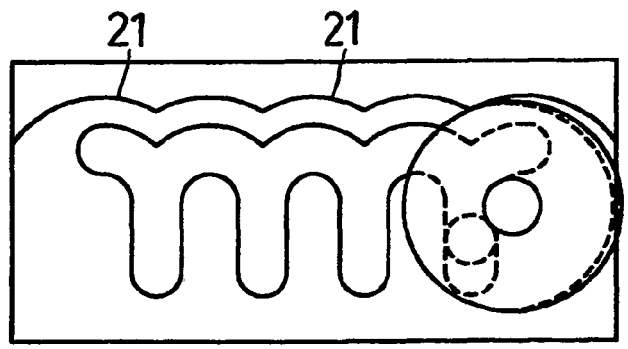
FIG. 9 shows a state when the pinion cam has been rotated 135° counterclockwise.

FIG. 9 shows a state when the pinion cam has been rotated 135° counterclockwise. As shown in FIG. 9, the locking surface portion 14 is now separated from the rightmost first cambered surface 21 to allow the horizontal movement of the rack cam 2. And the rack cam has moved rightwards by a certain distance under the action of the rotation pin 13. The rotation pin 13 pushes and moves the rack cam by a flat side surface 25 of the U-shaped curved surface.

Figure 10:
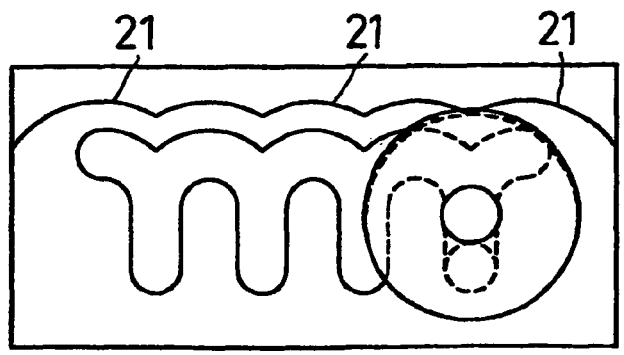
FIG. 10 shows a state when the pinion cam has been rotated 180° counterclockwise.
Figure 11:
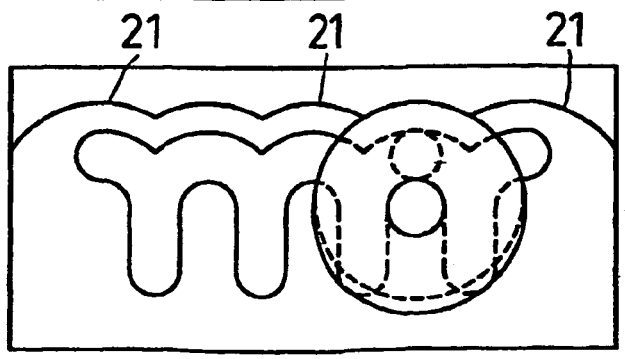
FIG. 11 shows a state-when the pinion cam has been rotated 360° counterclockwise.

FIG. 10 shows a state when the pinion cam has been rotated 180° counter clock-wise. As shown in FIG. 11, the rotation pin 13 is now located directly below the axis 12 and the rack cam 2 has moved rightwards by half step.

FIG. 11 shows a state when the pinion cam 1 has been rotated 360° counter clock-wise. As can be taken from FIG. 11, the rotation pin 13 is now located directly above the axis 12 and the rack cam 2 has moved rightwards by one step. The locking surface portion 14 on the cam 12 now contacts with the second first cambered surface 21 and holds the rack cam in position. Therefore, the rack cam is now held in its second stop position. Thus it can be seen that the rack cam moves one step horizontally when the pinion cam turns 360°.

One preferred embodiment of the step movement mechanism of the invention has been described above in connection with the accompanying drawings. However, it will be appreciated by the person skilled in the art that the invention is not restricted to the specific embodiment, and various modifications can be made to the embodiment without departing from the scope and spirit of the invention.

In the preferred embodiment, the second cambered surfaces 22 of the rack cam surface C are curved surfaces so as to contact the rotation pin 13 within a certain rotation range of the pinion cam. Nevertheless, it is not necessarily required that the rotation pin contacts the second cambered surfaces, and therefore the second cambered surfaces can be replaced by a surface of any type if only the surface does not interfere with the movement of the rotation pin. Furthermore, when the second cambered surfaces 22 are concave circular cylindrical surfaces which make contact with the rotation pin, the rotation pin can also function as stop means which prevents the rack cam form moving when it is in contact with the second cambered surfaces. And in such a case, the cam and the corresponding guide and lock female cam surface D can even be omitted. And when the rotation pin is used as stop means, a portion of the circumferential surface of the rotation pin is preferably a circular cylindrical surface of the same radius as that of the concave circular cylindrical surfaces, so that the circular cylindrical surface on the rotation pin is in surface contact with one of the concave circular cylindrical surfaces when in a stop position, therefore the operation performance of the step movement mechanism can be improved. In the preferred embodiment, the force-bearing surface pair is formed by the two opposite flat side surfaces of the U-shaped curved surface, obviously the force-bearing surface pair may be otherwise formed.

In the preferred embodiment, the number of stop positions of the rack cam are five as shown, however more or less stop positions may be adopted in accordance with the practical use of the step movement mechanism.

To further reduce the wear and noise, a swivel bearing may be fitted over the rotation pin, so that the bearing turns when the rotation pin contacts and pushes the flat surface of the U-shaped curved surface so as to reduce wear and noise.

In the preferred embodiment, the rack cam is constructed as a member, which moves linearly. As a further alternative to the embodiment, however, the rack cam can be constructed as a member, which rotates about an axis, thus forming a rotary type step movement mechanism.

Figure 12:
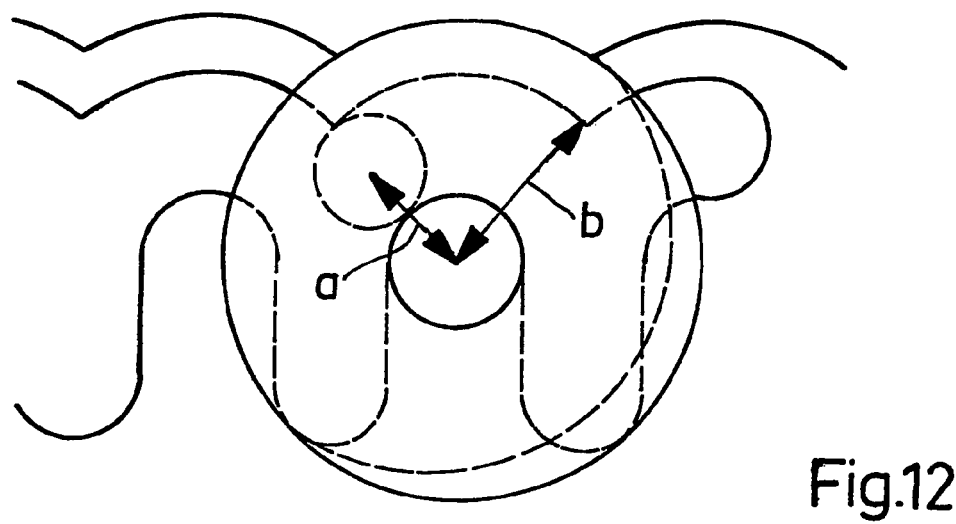
FIG. 12 is partial and schematical view showing one example for calculating the trajectory of the cam.

The cam may be of different shapes, only if a portion of the cam surface is in contact with the first cambered surfaces on the rack cam to hold the rack cam in position when in a stop position while other portion of the cam surface does not interfere with the linear movement of the rack cam. Furthermore, for a given shape of the cam, the shape of the cam can be calculated several ways. FIG. 12 shows one example, which is made for 3D CAD system to draw it. The curve for the cam surface 12 is defined by the coordinates (x, y) as given by the equations below. The program used for calculating the trajectory is as follows:

a=4.500004
b=8.499998
C=180−59.56473
E=(B*cos(C|deg|)+(A−A*cos(u|deg|)))
F=B*sin(C|deg|)
D=SQRT(E2+F2)
x=D*cos(C|deg|+u|deg|)
y=D*sin(C|deg|+u|deg|)

Figure 13:
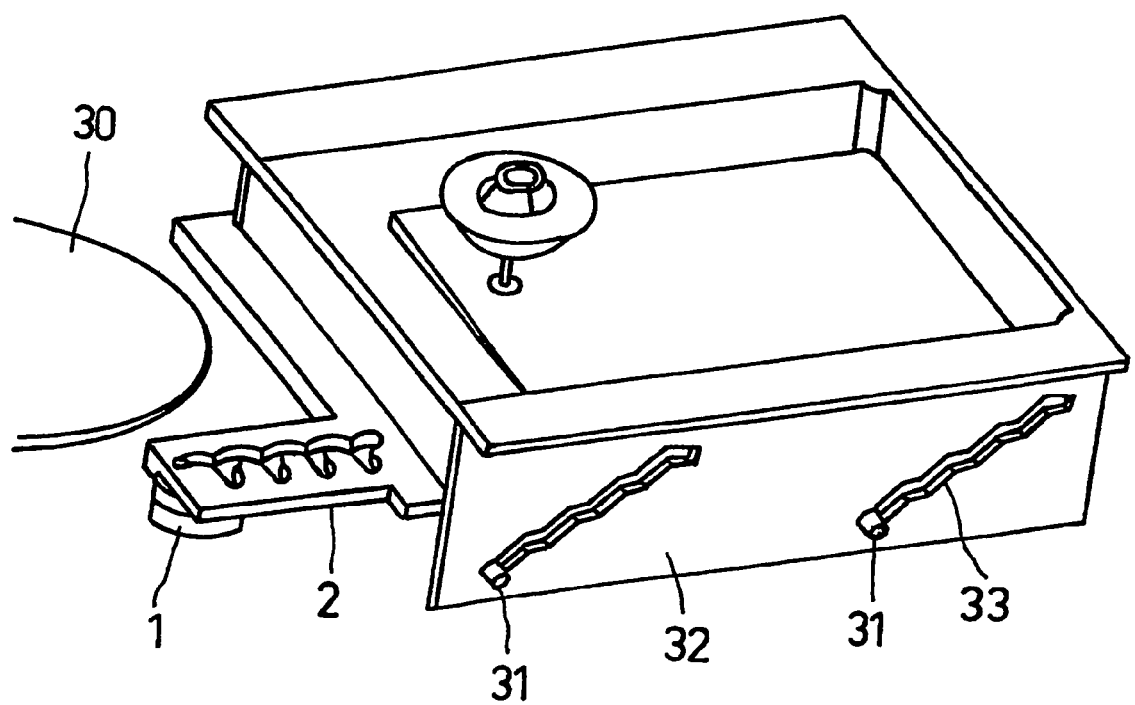
FIG. 13 shows schematically an example of application of the step movement mechanism of the invention in an disk changing system.

FIG. 13 shows the application of the step movement mechanism of the invention in a disk changing system of a disc recording and/or reproducing device, which is illustrated only schematically. The disk changing system comprises a stack like magazine 30 for accommodating a plurality of disks therein. As shown in FIG. 13, the stack like magazine comprises a disk lifting/lowering stage provided with a pair of pins 31 on both the left and right sides, and a pair of sliders 32 are arranged on the left and right sides of the device respectively. A pair of stepped slits 33 is formed in the sliders, and the pins 31 extend through the corresponding stepped slits. The rack cam 2 of the step movement mechanism of the invention is mechanically connected with the sliders. As a result, the movement of the rack cam of the step movement mechanism is transmitted to the sliders to slide the sliders; the movement of the sliders raises or lowers the pins and thus the disc lifting/lowering stage so as to conduct disk-changing operation.

The invention claimed is:

1. A step movement mechanism, comprising a driven member and driving means which drives the driven member, wherein
    said driven member being formed with a plurality of equally spaced first concave cambered surfaces and a plurality of equally spaced force-bearing surface pairs, the two surfaces of each surface pair facing each other;
    the driving means comprising:
    a drive source to rotate a cam gear;
    the cam gear carrying a rotation pin and stop means both rotating with the cam gear;
    the stop means being in contact with one of the first concave cambered surfaces when the step movement mechanism is in a stop position so as to prevent the driven member from moving;
    the rotation pin being temporarily in contact with one surface of the force bearing surface pair so as to move the driven member by one step when the cam gear rotates one revolution in either direction.

2. The step movement mechanism as claimed in claim 1, wherein each first concave cambered surface is a concave circular cylindrical surface which contacts with said stop means when said step movement mechanism is in a stop position.

3. The step movement mechanism as claimed in claim 2, wherein said stop means is a cam, and said rotation pin is provided on the cam.

4. The step movement mechanism as claimed in claim 3, wherein a portion of the circumferential surface of the cam is a convex circular cylindrical surface of the same radius as that of said concave circular cylindrical surfaces which is in surface contact with one of the concave circular cylindrical surfaces when the step movement mechanism is in a stop position.

5. The step movement mechanism as claimed in claim 4, wherein said driven member is further formed with a plurality of equally spaced second concave cambered surfaces which contact with said rotation pin.

6. The step movement mechanism as claimed in claim 5, wherein said second concave cambered surfaces are circular cylindrical surfaces.

7. The step movement mechanism as claimed in claim 2, wherein said rotation pin is used as said stop means.

8. The step movement mechanism as claimed in claim 7, wherein said rotation pin is a circular cylindrical pin.

9. The step movement mechanism as claimed in claim 8, wherein a swivel bearing is fitted over said circular cylindrical pin.

10. The step movement mechanism as claimed in claim 7, wherein a portion of the circumferential surface of said rotation pin is a convex circular cylindrical surface of the same radius as that of said concave circular cylindrical surfaces, the convex circular cylindrical surface on said rotation pin is in surface contact with one of the concave circular cylindrical surfaces when the step movement mechanism is in a stop position.

11. The step movement mechanism as claimed in claim 1, wherein a swivel bearing is fitted over rotation pin.

12. The step movement mechanism as claimed in claim 1, wherein said step movement mechanism is a translation type step movement mechanism.

13. The step movement mechanism as claimed in claim 1, wherein said step movement mechanism is a rotary type step movement mechanism.

14. A disk changing system for a disc recording and/or reproducing device, said disk changing system comprising a stack like magazine for accommodating a plurality of disks therein, characterized in that said disk changing system comprising a step movement mechanism as claimed in claim 1.

* * * * *